United States Patent
Cui et al.

(10) Patent No.: US 11,569,055 B2
(45) Date of Patent: Jan. 31, 2023

(54) SCANNING-TYPE X-RAY SOURCE AND IMAGING SYSTEM THEREFOR

(71) Applicants: Zhili Cui, Beijing (CN); Jian Gao, Beijing (CN); Jinhui Xing, Beijing (CN)

(72) Inventors: Zhili Cui, Beijing (CN); Jian Gao, Beijing (CN); Jinhui Xing, Beijing (CN)

(73) Assignee: NANOVISION TECHNOLOGY (BEIJING) CO., LTD, Beijing (CN)

( * ) Notice: Subject to any disclaimer, the term of this patent is extended or adjusted under 35 U.S.C. 154(b) by 31 days.

(21) Appl. No.: 17/137,064

(22) Filed: Dec. 29, 2020

(65) Prior Publication Data

US 2021/0148840 A1   May 20, 2021

Related U.S. Application Data

(63) Continuation of application No. PCT/CN2019/090988, filed on Jun. 12, 2019.

(30) Foreign Application Priority Data

Jun. 29, 2018  (CN) .......................... 201810694166.6
Jun. 29, 2018  (CN) .......................... 201821016550.2

(51) Int. Cl.
*H01J 35/30*   (2006.01)
*H01J 35/04*   (2006.01)
(Continued)

(52) U.S. Cl.
CPC ............ *H01J 35/30* (2013.01); *H01J 35/045* (2013.01); *H01J 35/112* (2019.05); *H01J 35/12* (2013.01);
(Continued)

(58) Field of Classification Search
CPC ........ H01J 35/30; H01J 35/045; H01J 35/112; H01J 35/12; H01J 35/147; H01J 35/153; H01J 35/18; H01J 35/13
See application file for complete search history.

(56) References Cited

U.S. PATENT DOCUMENTS 4,158,142 A * 6/1979 Haimson .............. A61B 6/4028
                                                                378/138
4,159,436 A * 6/1979 Ely ....................... H01J 35/066
                                                                378/138
(Continued)

*Primary Examiner* — Chih-Cheng Kao
(74) *Attorney, Agent, or Firm* — George Guosheng Wang; Upstream Research and Patent LLC

(57) ABSTRACT

Provided are a scanning-type X-ray source and an imaging system therefor. The scanning-type X-ray source comprises a vacuum cavity (1), wherein a cathode (2) and a plurality of anode target structures (3) are arranged in the vacuum cavity (1); a gate electrode (4) is arranged in a position, close to the cathode (2), in the vacuum cavity (1); a focusing electrode (5) is arranged in a position, close to the gate electrode (4), in the vacuum cavity (1); and a deflection coil (6) is arranged in a position, close to the gate electrode (4), at the outer periphery of the vacuum cavity (1). The scanning-type X-ray source generates electron beams by using cathode (2), controls the powering-on/off of the electron beams by the gate electrode (4), and the deflection coil (6) controls the direction of motion of the electron beams, so as to complete the switching between multiple focuses.

11 Claims, 6 Drawing Sheets

(51) Int. Cl.
*H01J 35/18* (2006.01)
*H01J 35/08* (2006.01)
*H01J 35/14* (2006.01)
*H01J 35/12* (2006.01)
*H01J 35/06* (2006.01)
*G01N 23/046* (2018.01)

(52) U.S. Cl.
CPC .......... *H01J 35/147* (2019.05); *H01J 35/153* (2019.05); *H01J 35/18* (2013.01); *G01N 23/046* (2013.01); *H01J 35/06* (2013.01); *H01J 35/08* (2013.01); *H01J 35/13* (2019.05); *H01J 2235/1033* (2013.01); *H01J 2235/18* (2013.01)

(56) References Cited

U.S. PATENT DOCUMENTS

| | | | | |
|---|---|---|---|---|
| 7,215,741 | B2* | 5/2007 | Ukita | H01J 35/12 378/119 |
| 2001/0024485 | A1* | 9/2001 | Rogers | H01J 35/18 378/143 |
| 2004/0101110 | A1* | 5/2004 | Eppler | H05G 1/52 378/207 |
| 2014/0185776 | A1* | 7/2014 | Li | H01J 35/30 378/113 |
| 2015/0078509 | A1* | 3/2015 | Tang | H01J 35/045 378/4 |
| 2018/0345039 | A1* | 12/2018 | Boyd | H01J 35/112 |

\* cited by examiner

SCANNING-TYPE X-RAY SOURCE AND IMAGING SYSTEM THEREFOR

BACKGROUND

Technical Field

The present invention relates to a scanning-type X-ray source, also relates to an imaging system including the scanning-type X-ray source, and belongs to the technical field of radiation imaging.

Related Art

In the field of radiation imaging, images at a plurality of projection angles usually need to be obtained by, for example, a tomosynthesis (TOMO) imaging system, an inversive geometry imaging system, and a computed tomography (CT) imaging system.

Different imaging systems obtain images at a plurality of projection angles in respective manners. For example, the TOMO imaging system rotates or translates an X-ray source, and exposes at different angles or displacements to obtain images at a plurality of projection angles. The inversive geometry imaging system obtains projection images at different angles by using an area array multi-focus X-ray source. The mainstream CT imaging system rotates an X-ray source and a detector at a high speed to obtain projection images at a plurality of angles. However, a new generation static CT imaging system uses a double-ring structure of a detector ring and a ray source ring, a plurality of X-ray sources are evenly distributed on the ray source ring, and each X-ray source corresponds to a projection image at one angle.

In an application scenario of obtaining images at a plurality of projection angles, existing system designs still mostly use a mobile X-ray source. It is not difficult to find that the multi-focus X-ray source method has more obvious advantages. In addition, when images at a plurality of projection angles are obtained by using the mobile X-ray source, the X-ray source needs to be rotated or translated by using a motion mechanism. Consequently, a mechanical motion artifact is easily generated, and quality of a reconstructed image is affected.

SUMMARY

A primary technical problem to be resolved in the present invention is to provide a scanning-type X-ray source.

Another technical problem to be resolved in the present invention is to provide an imaging system including the scanning-type X-ray source.

To achieve the objectives, the following technical solutions are used in the present invention:

According to a first aspect of embodiments of the present invention, a scanning-type X-ray source is provided, including a vacuum cavity, where a cathode and a plurality of anode target structures are disposed inside the vacuum cavity, a location close to the cathode inside the vacuum cavity is provided with a grid, a location close to the grid inside the vacuum cavity is provided with a focusing, electrode, and a location that is close to the grid and that is on the periphery of the vacuum cavity is provided with a deflection coil, and the grid controls an electron beam generated by the cathode to bombard target surfaces of corresponding anode target structures one by one according to a preset rule after being focused by the focusing electrode and deflected by the movement direction of the deflection coil, and generates X-rays from bombarding sides of the target surface, to form a plurality of focuses arranged according to a preset arrangement shape.

Preferably, when a narrow-beam X-ray is generated and emitted by at least one anode target structure and the anode target structure uses an integral reflection target, an upper surface of the integral reflection target is provided with a heat dissipation block, an upper surface of the heat dissipation block is provided with a steel plate, a plurality of collimation holes are arranged on the steel plate in a linear array form, and the collimation hole corresponds to one beryllium window, to form a plurality of exit ports of the X-ray.

Preferably, when a narrow-beam X-ray is generated and emitted by at least one anode target structure and the anode target structure is arranged in an array form, the anode target structure uses an independent individual reflection target, an upper surface of the independent individual reflection target is provided with a heat dissipation block, an upper surface of the heat dissipation block is provided with a steel plate, the steel plate is provided with a collimation hole corresponding to the independent individual reflection target, and the collimation hole corresponds to one beryllium window, to form a plurality of exit ports of the X-ray.

Preferably, the collimation hole is embedded in the steel plate, and the beryllium window is embedded in the heat dissipation block and the steel plate and runs through the corresponding collimation hole.

Preferably, when a wide-beam X-ray is generated and emitted by at least one anode target structure and the anode target structure uses an integral reflection target, a lower surface of the integral reflection target is provided with a heat dissipation block, an upper surface of the integral reflection target is provided with a steel plate, a plurality of collimation holes are arranged on the steel plate in a linear array form, and the collimation hole corresponds to one beryllium window, to form a plurality of exit ports of the X-ray.

Preferably, when a wide-beam X-ray is generated and emitted by at least one anode target structure and the anode target structure is arranged in an array form, the anode target structure uses an independent individual reflection target, an upper surface of the independent individual reflection target is provided with a steel plate, a lower surface of the independent individual reflection target is provided with a heat dissipation block, the steel plate is provided with a collimation hole corresponding to the independent individual reflection target, and the collimation hole corresponds to a beryllium window, to form a plurality of exit ports of the X-ray.

Preferably, the collimation hole is embedded in the steel plate, and the beryllium window is embedded in the steel plate and runs through the corresponding collimation hole.

Preferably, the scanning-type X-ray source is provided with a grid-controlled switch, the grid-controlled switch is fixed to the vacuum cavity through a support, an output end of the grid-controlled switch is connected to the grid through a wire, the grid-controlled switch is connected to a grid-controlled power supply, and the grid-controlled power supply is connected to an external high voltage power supply.

Preferably, the deflection coil includes an X direction deflection coil and a Y direction deflection coil, the X direction deflection coil and the Y direction deflection coil are respectively provided with control interfaces, the control interfaces are separately connected to a master control circuit, and the master control circuit respectively applies preset voltage waveforms to the control interfaces of the X direction deflection coil and the Y direction deflection coil, to control a motion direction of the electron beam generated by the cathode.

Preferably, when an X-ray is generated and emitted by one anode target structure and the anode target structure uses an integral reflection target, the electron beam emitted by the cathode directly faces a target surface of the integral reflection target.

Preferably, when X-rays are generated and emitted by the plurality of anode target structures arranged in a linear array form, and the anode target structure uses an independent individual reflection target, the electron beam emitted by the cathode directly faces a target surface of the independent individual reflection target.

According to a second aspect of the embodiments of the present invention, an imaging system is provided, including the scanning-type X-ray source.

According to the scanning-type X-ray source provided in the present invention, an electron beam is generated by a cathode, powering-on/off of the electron beam is controlled by a grid, and a motion direction of the electron beam is controlled by a deflection coil, so that a corresponding target surface is bombarded one by one according to a preset rule, to complete switching between a plurality of focuses. This manner not only improves efficiency of the scanning-type X-ray source, but also meets requirements of the imaging system on the scanning-type X-ray source and obtaining images at a plurality of projection angles, and a problem that a mechanical motion artifact is generated when an X-ray source is rotated or translated by using a motion mechanism is resolved. In addition, the scanning-type X-ray source further has larger power and heat capacity and has features of small volume and high focus density.

DETAILED DESCRIPTION

The technical content of the present invention is further described in detail below with reference to the accompanying drawings and specific embodiments.

Figure 1:
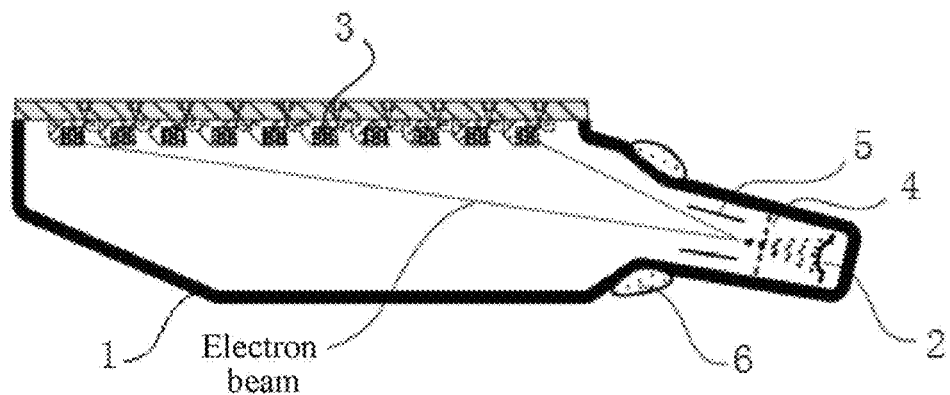
FIG. 1 is a schematic structural diagram of a scanning-type X-ray source according to the present invention.

As shown in FIG. 1, a scanning-type X-ray source provided in the present invention includes a vacuum cavity 1, a cathode 2 and a plurality of anode target structures 3 are disposed inside the vacuum cavity 1, a location close to the cathode 2 inside the vacuum cavity 1 is provided with a grid (gate electrode) 4, a location close to the grid 4 inside the vacuum cavity 1 is provided with a focusing electrode 5, and a location that is close to the grid 4 and that is on the periphery of the vacuum cavity 1 is provided with a deflection coil 6. An electron beam generated by the cathode is sequentially subject to focusing of the focusing electrode 5 and motion direction control of the deflection coil 6 through the grid 4, so that target surfaces of corresponding anode target structures 3 are scanned and bombarded one by one according to a preset rule, and X-rays are generated from bombarding sides of the target surfaces, to form a plurality of focuses arranged according to a preset arrangement shape. The preset arrangement shape of arrangement of the focuses may depend on requirements of an imaging system.

Specifically, the vacuum cavity 1 is configured to enable the cathode 2 and the plurality of anode target structures 3 to be in a high vacuum environment. On the one hand, the electron beam generated by the cathode 2 may successfully reach a corresponding anode target structure 3 and is not lost due to collision with air molecules. On the other hand, an insulation feature of vacuum enables the anode target structure 3 to be in a high voltage state relative to the cathode 2 without easily causing breakdown and sparking.

A cathode filament may be used as the cathode 2, the cathode filament is connected to a filament power supply, the filament power supply is connected to an external high voltage power supply, and a current of the filament power supply is controlled by the external high voltage power supply. Under the action of the filament power supply, the cathode filament is heated to a preset temperature (for example, 2000° C. to 3000° C.), so that a preset quantity of electrons (sufficient active electrons) are generated on a surface of the cathode filament, to form an electron beam (a size of the electron beam is related to a size of an electron beam current that needs to be emitted by the cathode filament). The cathode filament may be made of a tungsten wire with a high melting point.

Figure 2:
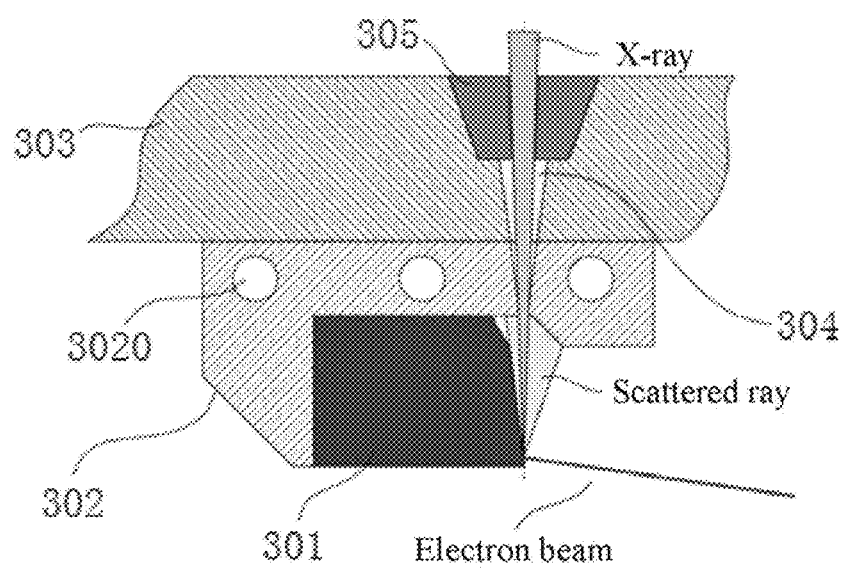
FIG. 2 is a schematic structural diagram of an anode target structure in a scanning-type X-ray source according to the present invention.
Figure 3:
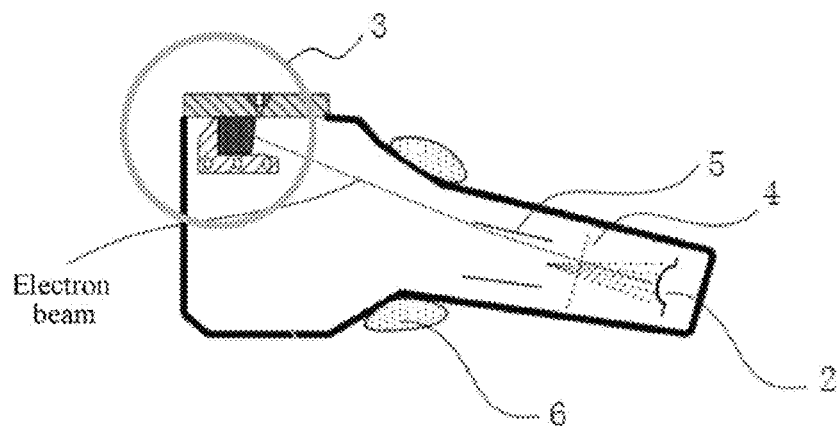
FIG. 3 is another schematic structural diagram of an anode target structure in a scanning-type X-ray source according to the present invention.

As shown in FIG. 2 and FIG. 3, each anode target structure 3 includes a reflection target 301, a heat dissipation block 302, a steel plate 303, a beryllium window 304, and a collimation hole 305, and the anode target structure 3 may generate and emit a narrow-beam X-ray or a wide-beam X-ray. As shown in FIG. 2, when a narrow-beam X-ray (an exit angle of the X-ray is relatively small) is generated and emitted by at least one anode target structure 3 and each anode target structure 3 uses an integral reflection target 301, an upper surface of the integral reflection target 301 is provided with a heat dissipation block 302, thereby implementing heat dissipation of the integral reflection target 301. An upper surface of the heat dissipation block 302 is provided with a steel plate 303, and the steel plate 303 may be used as a carrier of the beryllium window 304 and the collimation hole 305 and may also be used to block unwanted scattered rays, and has a specific heat dissipation function. According to an X-ray exit location required by an applied imaging system, a plurality of collimation holes 305 may be arranged on the steel plate 303 in a linear array form (a quantity of lines (in a Y direction) of collimation holes 305 is 1), and the collimation holes 305 are embedded in the steel plate 303. Each collimation hole 305 corresponds to one beryllium window 304, and each beryllium window 304 is embedded in the heat dissipation block 302 and the steel plate 303 and runs through the corresponding collimation hole 305, thereby sealing the collimation hole 305 and forming a plurality of exit ports of the X-ray.

It should be emphasized that, When a plurality of anode target structures formed by the integral reflection targets 301 are used, a plurality of collimation holes 305 arranged on two adjacent anode target structures may be in a one-to-one correspondence, or a plurality of collimation holes 305 arranged on two adjacent anode target structures may not be in a one-to-one correspondence, that is, after being arranged, all collimation holes 305 may form a special-shaped surface such as a circular surface or a rectangular surface Each collimation hole 305 corresponds to one beryllium window 304, and each beryllium window 304 is embedded in the heat dissipation block 302 and the steel plate 303 and runs through a corresponding collimation hole 305, thereby sealing the collimation hole 305 and forming a plurality of exit ports of the X-ray. The plurality of exit ports are aligned with a target surface of the integral reflection target 301 bombarded by electrons, so that after a large quantity of electrons generated by the cathode filament bombard a target surface of the integral reflection target 301, the target surface directly generates an X-ray and emits the X-ray from an exit port corresponding to the target surface.

When a narrow-beam X-ray is generated and emitted by at least one anode target structure 3 and the anode target structure 3 is arranged in an array form (including an area array form and a linear array form), each anode target structure 3 may use an independent individual reflection target 301, an upper surface of the independent individual reflection target 301 is provided with a heat dissipation block 302, an upper surface of the heat dissipation block 302 is provided with a steel plate 303, the steel plate 303 is provided with one collimation hole 305 corresponding to the independent individual reflection target 301, and the collimation hole 305 is embedded in the steel plate 303. Each collimation hole 305 corresponds to one beryllium window 304, and each beryllium window 304 is embedded in the heat dissipation block 302 and the steel plate 303 and runs through a corresponding collimation hole 305, thereby sealing the collimation hole 305 and forming a plurality of exit ports of the X-ray. Similarly, the plurality of exit ports are aligned with a target surface of the independent individual reflection target bombarded by electrons, so that after a large quantity of electrons generated by the cathode filament bombard a target surface of the independent individual reflection target 301, the target surface directly generates an X-ray and emits the X-ray from an exit port corresponding to the target surface.

Figure 4:
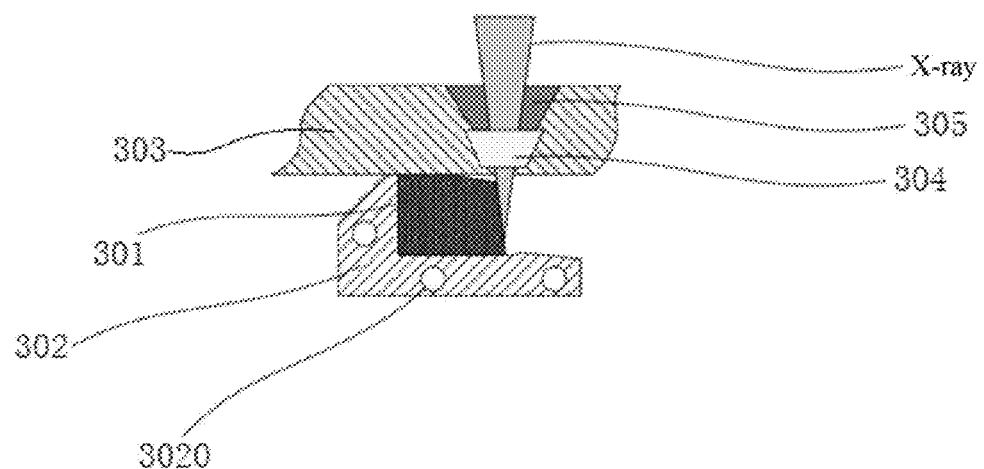
FIG. 4 is an enlarged schematic diagram of another structure of an anode target structure in a scanning-type X-ray source according to the present invention.

As shown in FIG. 3 and FIG. 4, when a wide-beam X-ray (an exit angle of the X-ray is relatively large) is generated and emitted by at least one anode target structure 3 and each anode target structure 3 uses an integral reflection target 301, a lower surface of the integral reflection target 301 is provided with a heat dissipation block 302, so that not only may heat dissipation of the reflection target 301 be implemented, but also more space may be left for designing of the collimation hole 305. An upper surface of each integral reflection target 301 is provided with a steel plate 303, and the steel plate 303 may be used as a carrier of the beryllium window 304 and the collimation hole 305 and may also be used to block unwanted scattered rays, and has a specific heat dissipation function According to an X-ray exit location required by an applied imaging system, a plurality of collimation holes 305 may be arranged on each steel plate 303 in a linear array form (a quantity of lines (in a Y direction) of collimation holes 305 is 1), and the collimation holes 305 are embedded in the steel plate 303. Each collimation hole 305 corresponds to one beryllium window 304, and each beryllium window 304 is embedded in the steel plate 303 and runs through a corresponding collimation hole 305, thereby sealing the collimation hole 305 and forming a plurality of exit ports of the X-ray.

It should be emphasized that, When a plurality of anode target structures 3 formed by the integral reflection targets 301 are used, a plurality of collimation holes 305 arranged on two adjacent anode target structures 3 may be in a one-to-one correspondence, or a plurality of collimation holes 305 arranged on two adjacent anode target structures 3 may not be in a one-to-one correspondence, and after being arranged, all collimation holes 305 may form a special-shaped surface such as a circular surface or a rectangular surface. Each collimation hole 305 corresponds to one beryllium window 304, and each beryllium window 304 is embedded in the steel plate 303 and runs through a corresponding collimation hole 305, thereby sealing the collimation hole 305 and forming a plurality of exit ports of the X-ray. The plurality of exit ports are aligned with a target surface of the integral reflection target 301 bombarded by electrons, so that after a large quantity of electrons generated by the cathode filament bombard a target surface of the integral reflection target 301, the target surface directly generates an X-ray and emits the X-ray from an exit port corresponding to the target surface.

When a wide-beam X-ray is generated and emitted by at least one anode target structure 3 and the anode target structure 3 is arranged in an array form (including an area array form and a linear array form), each anode target structure 3 may use an independent individual reflection target 301, an upper surface of each independent individual reflection target 301 is provided with a steel plate 303, a lower surface of each independent individual reflection target 301 is provided with a heat dissipation block 302, each steel plate 303 is provided with one collimation hole 305 corresponding to the independent individual reflection target 301, and the collimation hole 305 is embedded in the steel plate 303. Each collimation hole 305 corresponds to one beryllium window 304, and each beryllium window 304 is embedded in the steel plate 303 and runs through a corresponding collimation hole 305, thereby sealing the collimation hole 305 and forming a plurality of exit ports of the X-ray. Similarly, the plurality of exit ports are aligned with a target surface of the independent individual reflection target bombarded by electrons, so that after a large quantity of electrons generated by the cathode filament bombards a target surface of the independent individual reflection target 301, the target surface directly generates an X-ray and emits the X-ray from an exit port corresponding to the target surface.

Figure 6:
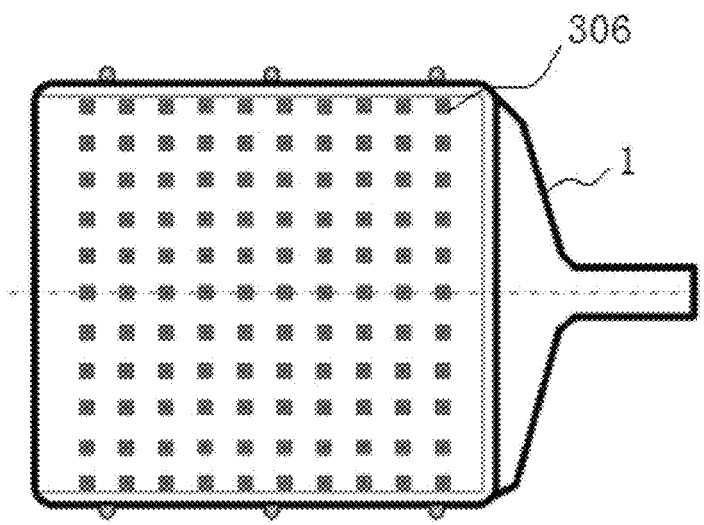
FIG. 6 is a schematic structural diagram of a scanning-type X-ray source arranged in a 10*10 array in a scanning-type X-ray source according to an embodiment of the present invention.

In the foregoing types of anode target structures 3, locations of each collimation hole 305 and a corresponding beryllium window 304 therefor depend on the X-ray exit location required by the applied imaging system. To ensure better bonding between the anode target structure 3 and the vacuum cavity 1 and ensure a sealing effect of the vacuum cavity 1, a plurality of anode target structures 3 may share a same integral steel plate 303, that is, all collimation holes 305 and corresponding beryllium windows 304 therefor that are of the scanning-type X-ray source are embedded in the same integral steel plate 303. For example, as shown in FIG. 6, a scanning-type X-ray source of a 10*10 array is used as an example, a plurality of collimation holes 305 and corresponding beryllium windows 304 therefor that are arranged in a 10*10 array are embedded in the steel plate 303, thereby forming a plurality of exit ports 306 of an X-ray.

Figure 5:
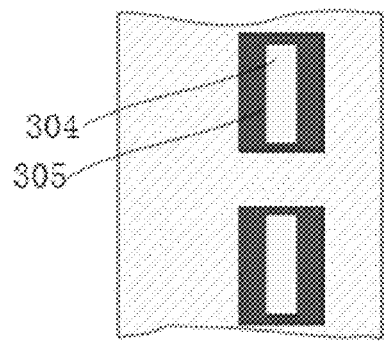
FIG. 5 is a top view of an anode target structure in a scanning-type X-ray source according to the present invention.

A preset quantity of heat dissipation pipes 3020 are evenly distributed on the heat dissipation block 302 of the foregoing types of anode target structures 3, and the heat dissipation pipe 3020 is injected with a coolant, thereby implementing heat dissipation of the reflection target 301. The coolant may be a flowable high voltage insulating material, for example, transformer oil (high voltage insulating oil) The heat dissipation block 302 may be made of a metal or metal alloy material such as copper with a high thermal conduction coefficient, and a shape and a size of the heat dissipation block 302 may be determined according to a shape of the reflection target 301, the X-ray exit location, and the heat dissipation effect. According to an actual requirement of the applied imaging system (for example, a shape and a size of an X-ray focus and an exit angle required for the imaging system), a shape, a size (for example, a circular cone or a polyhedral cone), and an exit angle of an exit face of the collimation hole 305 of the foregoing types of anode target structure 3 are adjusted. For example, as shown in FIG. 5, when the applied imaging system requires the scanning-type X-ray source to emit a rectangular X-ray focus, a shape of the exit face of the collimation hole 305 may be a rectangle, and the collimation hole 305 appears as a tetrahedral cone in three dimensions.

The beryllium window 304 of the foregoing types of anode target structures 3 may be made of a light beryllium material with a small atomic number, which has basically no attenuation on an X-ray. Similarly, according to an actual requirement of the applied imaging system (for example, a shape and a size of an X-ray focus), a shape and a size of the beryllium window 304 are adjusted. For example, as shown in FIG. 5, when the applied imaging system requires the scanning-type X-ray source to emit a rectangular X-ray focus, a shape of the exit face of the beryllium window 304 may be a rectangle. In addition, the reflection target 301 may be made of a metal material or metal alloy material with a large atomic number or a high melting point such as a metal tungsten or molybdenum, or a tungsten-rhenium alloy.

Moreover, when the anode target structure 3 uses the independent individual reflection target 301, and in a process in which an electron beam generated by the cathode filament scans and bombards a target surface of the independent individual reflection target 301 line by line (in an X direction) and one by one, an X-ray is generated only when the electron beam reaches a location of the target surface of the independent individual reflection target 301, and is emitted from an exit port formed by the beryllium window 304 and the collimation hole 305. When the anode target structure 3 uses the integral reflection target 301, and in a process in which the electron beam generated by the cathode filament scans and bombards a target surface of the integral reflection target 301 line by line (in the X direction) and one by one, the target surface of the integral reflection target 301 always generates an X-ray, but the X-ray is emitted only from the exit port formed by the beryllium window 304 and the collimation hole 305. As an option, by using a feature that the grid 4 may control an emission status (powering-on/off) of the electron beam, a control state of a grid-controlled switch may be synchronized with the line-by-line (in the X direction) and one-by-one scanning of the electron beam. That is, when the electron beam reaches the target surface corresponding to a location of the exit port of the X-ray, the grid-controlled switch is turned off, and the electron beam may be emitted normally and bombard the target surface, so that the X-ray is emitted from the exit port; and when the electron beam leaves the target surface corresponding to the location of the exit port of the X-ray, the grid-controlled switch is turned on, and the electron beam cannot be emitted normally under control of the grid-controlled switch and cannot bombard the target surface, so that the X-ray is stopped from being emitted.

The scanning-type X-ray source is provided with a grid-controlled switch (not shown), the grid-controlled switch is fixed to the vacuum cavity 1 through a support, and an output end of the grid-controlled switch is connected to the grid 4 of the scanning-type X-ray source through a wire, so that powering-on/off (switching on/switching off) of the electron beam emitted by the cathode filament of the scanning-type X-ray source is controlled, thereby controlling ray emission of the scanning-type X-ray source. Specifically, the grid-controlled switch is connected to a grid-controlled power supply, the grid-controlled power supply is connected to an external high voltage power supply, and the grid-controlled switch is controlled to be in an on or off state by the grid-controlled power supply 3, to control powering-on/off of the scanning-type X-ray source, thereby controlling ray emission.

For example, a plurality of anode target structures 3 of the scanning-type X-ray source are grounded. When the grid-controlled power supply controls the grid-controlled switch to be in the on state, a negative high voltage (for example, the negative high voltage is −130 KV) may be applied to the grid 4 by the grid-controlled power supply, and an absolute value of the negative high voltage applied to the grid 4 is greater than an absolute value of a negative high voltage (for example, the negative high voltage of the cathode is −120 KV) of the cathode 2 of the scanning-type X-ray source, so that a negative electric field is formed between the grid 4 and the cathode 2, and a preset quantity of electrons generated on the surface of the cathode filament are prevented from flying to the target surface of the anode target structure 3, thereby switching off the electron beam emitted by the cathode filament. When the negative high voltage applied to the grid is large enough, the electrons generated on the surface of the cathode filament are entirely suppressed on the surface of the cathode filament and cannot fly to the target surface of the anode target structure 3. When the grid-controlled power supply controls the grid-controlled switch to be in the off state, the negative high voltage applied to the grid-controlled switch disappears, so that a voltage difference is formed between the anode target structure 3 and the cathode 2. In this case, a large quantity of electrons generated on the surface of the cathode filament form an electron beam under the action of relatively large electric potential energy to fly to the target surface of the anode target structure 3, to generate an X-ray, and the X-ray is emitted from a corresponding exit port, to form a focus.

In the scanning-type X-ray source, the focusing electrode 5 is configured to focus the electron beam generated by the cathode filament and limit divergence of the electron beam, to constrain the electron beam and obtain a focal spot with a proper size on the anode target structure 3. Specifically, the focusing electrode 5 is connected to an external master control circuit, and the focusing electrode 5 is controlled by the master control circuit to focus the electron beam emitted by the cathode filament. A focusing effect will affect a size of a spot surface of the target surface of the anode target structure 3 bombarded by the electron beam. The focusing of the focusing electrode 5 is divided into electric field focusing and magnetic field focusing, which are commonly used in electronics. Details are not described herein again.

The deflection coil 6 includes an X direction deflection coil and a Y direction deflection coil and is configured to implement movement of the electron beam generated by the cathode filament on X and Y surfaces. Through the deflection coil 6, the electron beam generated by the cathode filament may be further focused and a motion direction of the electron beam may be controlled. The X direction deflection coil and the Y direction deflection coil are provided with control interfaces, and the control interfaces are separately connected to the master control circuit. A plurality of voltage waveforms that correspond to the X direction deflection coil and the Y direction deflection coil are preset in the master control circuit according to a preset rule, and preset voltage waveforms may be respectively applied to the control interfaces of the X direction deflection coil and the Y direction deflection coil by the master control circuit, that is, the motion direction of the electron beam may be controlled. The preset rule refers to a scanning control manner of the electron beam. The scanning control manner may be line-by-line and one-by-one scanning, that is, the grid-controlled switch and the voltage waveforms applied to the X direction deflection coil and the Y direction deflection coil are controlled, so that the electron beam scans and bombards the target surface of the anode target structure 3 line by line (in the X direction) and one by one, to generate an X-ray. Alternatively, the scanning control manner may be column-by-column (in a Y direction) and one-by-one scanning, that is, the grid-controlled switch and the voltage waveforms applied to the X direction deflection coil and the Y direction deflection coil are controlled, so that the electron beam scans and bombards the target surface of the anode target structure 3 column by column (in the Y direction) and one by one, to generate an X-ray. Alternatively, the scanning control manner may be one-by one scanning according to locations of a plurality of focuses arranged according to a preset arrangement shape, that is, the grid-controlled switch and the voltage waveforms applied to the X direction deflection coil and the Y direction deflection coil are controlled, so that the electron beam scans and bombards the target surface of the corresponding anode target structure 3 one by one according to the locations of the plurality of focuses arranged according to the preset arrangement shape, to generate an X-ray Different scanning control manners of the electron beam may be designed according to actual application manners. Therefore, the electron beam may be controlled through the deflection coil 6 to complete arbitrary switching scanning between a plurality of target surfaces, thereby completing switching between a plurality of focuses (X-ray focuses) and improving efficiency of the scanning-type X-ray source.

Figure 7:
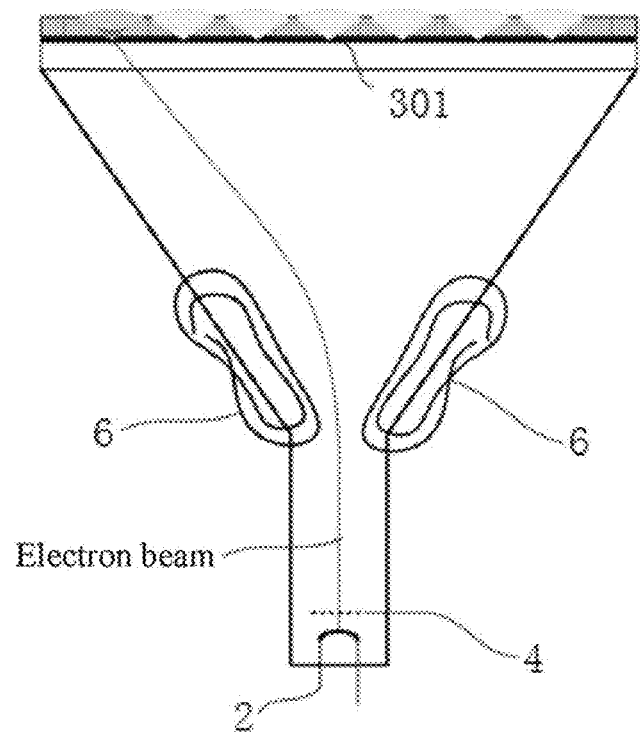
FIG. 7 is a schematic structural diagram of a scanning-type X-ray source arranged in a linear array in a scanning-type X-ray source according to an embodiment of the present invention.

In an embodiment of the present invention, when an X-ray (a wide-beam or narrow-beam X-ray) is generated and emitted by one anode target structure 3, the anode target structure 3 uses an integral reflection target 301, and a plurality of collimation holes 305 are arranged on a steel plate 303 of the integral reflection target 301 in a linear array form (a quantity of lines (in a Y direction) of collimation holes 305 is 1), or when an X-ray (a wide-beam or narrow-beam X-ray) is generated and emitted by a plurality of anode target structures 3 arranged in a linear array form, and the anode target structure 3 uses an independent individual reflection target 301, because the electron beam only scans and bombards a line of target surfaces of the anode target structures 3 in the Y direction, a fixed input level may be given to the Y direction deflection coil, and the level can ensure that a high-speed electron beam emitted by the cathode filament can bombard a location of the target surface in the Y direction. In consideration of a simpler design, as shown in FIG. 7, the electron beam emitted by the cathode filament of the scanning-type X-ray source may directly face the location of the target surface. Therefore, the Y direction deflection coil may not be required, so that the scanning-type X-ray source has a smaller volume.

By using the following several types of scanning control, manners of the electron beam as an example, application of the voltage waveforms to the X direction deflection coil and the Y direction deflection coil and how to control a motion direction of the electron beam are described below in detail with reference to FIG. 8.

Figure 8:
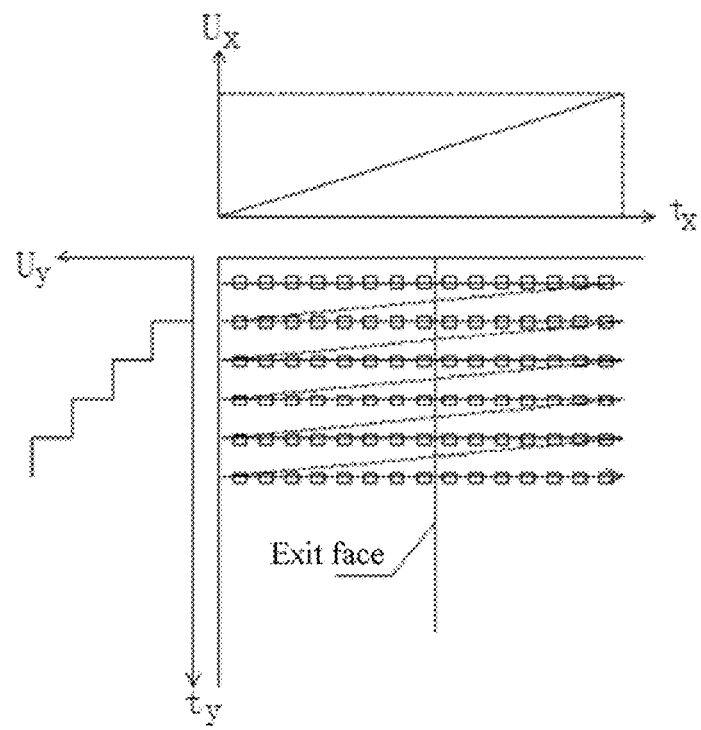
FIG. 8 is a schematic diagram of adjusting a voltage waveform applied to a deflection coil to control a motion direction of an electron beam in a scanning-type X-ray source according to an embodiment of the present invention.

As shown in FIG. 8, a block on an exit face represents an exit port 306 of a ray, an arrow represents a motion direction of an electron beam scanning and bombarding a target surface, a curve above the exit face represents a voltage waveform applied to an X direction deflection coil, a curve at the left of the exit face represents a voltage waveform applied to a Y direction deflection coil, and the voltage waveform applied to the X direction deflection coil matches the voltage waveform applied to the Y direction deflection coil, so that the electron beam scans and bombards a target surface of an anode target structure 3 one by one according to a left-to-right and top-to-bottom sequence, to generate an X-ray.

Specifically, after a triangular waveform voltage is applied to the X direction deflection coil, the electron beam may scan and bombard the target surface of the anode target structure 3 one by one from left to right in an X direction as the triangular waveform voltage applied to the X direction deflection coil increases, to generate the X-ray. When the triangular waveform voltage applied to the X direction deflection coil is changed from a maximum to a minimum, the electron beam returns to a leftmost starting point to start a new round of process of scanning and bombarding the target surface of the anode target structure 3 from left to right.

Similarly, after a triangular waveform voltage is applied to the Y direction deflection coil, the electron beam may scan and bombard the target surface of the anode target structure 3 one by one from top to bottom in a Y direction as the triangular waveform voltage applied to the Y direction deflection coil increases, to generate the X-ray. When the triangular waveform voltage applied to the Y direction deflection coil is changed from a maximum to a minimum, the electron beam returns to an uppermost starting point to start a new round of process of scanning and bombarding the target surface of the anode target structure 3 from top to bottom.

When the electron beam needs to scan and bombard the target surface of the anode target structure 3 line by line (in the X direction) and one by one, a step wave voltage may be applied to the Y direction deflection coil, and the triangular waveform voltage may be applied to the X direction deflection coil. That is, the step wave voltage applied to the Y direction deflection coil remains unchanged to ensure that a location of the electron beam in the Y direction remains unchanged, and the electron beam can scan and bombard the target surface of the anode target structure 3 one by one from left to right in the X direction, to generate the X-ray. When the step wave voltage applied to the Y direction deflection coil rises to a voltage corresponding to a next line of scanning location of the electron beam and maintains the voltage, the electron beam starts a new round of process of scanning and bombarding the target surface of the anode target structure 3 from left to right in the X direction. By analogy, each time the step wave voltage applied to the Y direction deflection coil increases by one step, the electron beam moves downward by one line, so that the electron beam scans and bombards the target surface of the anode target structure 3 line by line, column by column, and one by one in a whole area.

When the electron beam needs to scan and bombard the target surface of the anode target structure 3 column by column (in the X direction) and one by one, a step wave voltage may be applied to the X direction deflection coil, and the triangular waveform voltage may be applied to the Y direction deflection coil. That is, the step wave voltage applied to the X direction deflection coil remains unchanged to ensure that a location of the electron beam in the X direction remains unchanged, and the electron beam can scan and bombard the target surface of the anode target structure 3 one by one from top to bottom in the Y direction, to generate the X-ray. When the step wave voltage applied to the X direction deflection coil rises to a voltage corresponding to a next column of scanning location of the electron beam and maintains the voltage, the electron beam starts a new round of process of scanning and bombarding the target surface of the anode target structure 3 from top to bottom in the Y direction. By analogy, each time the step wave voltage applied to the X direction deflection coil increases by one step, the electron beam moves rightward by one column, so that the electron beam scans and bombards the target surface of the anode target structure 3 column by column, line by line, and one by one in a whole area.

The scanning-type X-ray source is not only applicable to an anode grounding X-ray source, but also applicable to a cathode grounding X-ray source or a neutral point grounding X-ray source. In the case of the cathode grounding X-ray source, a cathode is grounded, and a positive high voltage is applied to each anode target structure 3 by using an external high voltage power supply. In the case of the neutral point grounding X-ray source, a negative high voltage is applied to the cathode, and a positive high voltage is applied to each anode target structure 3.

According to the scanning-type X-ray source provided in the present invention, an electron beam is generated by a cathode, powering-on/off of the electron beam is controlled by the grid (gate electrode), and a motion direction of the electron beam is controlled by the deflection coil, so that corresponding target surfaces are bombarded one by one according to a preset rule, to complete switching between a plurality of focuses. This not only improves efficiency of the scanning-type X-ray source, but also meets requirements of the imaging system on the scanning-type X-ray source and obtaining images at a plurality of projection angles, and a problem that a mechanical motion artifact is generated when an X-ray source is rotated or translated by using a motion mechanism is resolved. In addition, the scanning-type X-ray source further has larger power and heat capacity and has features of small volume and high focus density.

The present invention further provides an imaging system, the imaging system includes the foregoing scanning-type X-ray source, requirements of the imaging system on the scanning-type X-ray source and obtaining images at a plurality of projection angles may be met, and occurrence of a mechanical motion artifact easily generated when an X-ray source is rotated or translated by using a motion mechanism is further avoided, thereby improving imaging quality of the imaging system. Other structures (structures other than the scanning-type X-ray source) and a working principle of the imaging system are the related art, and details are not described herein again.

For ease of understanding the imaging system, several types of layout structures formed by combining the imaging system and the scanning-type X-ray source are briefly described below with reference to FIG. 9 to FIG. 13.

Figure 9:
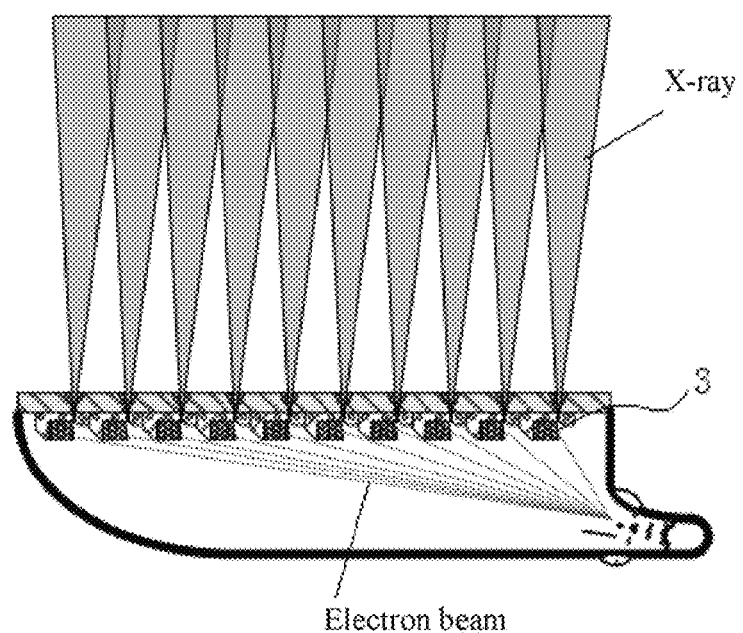
FIG. 9 is a schematic diagram of a layout structure of an imaging system using an inversive geometry imaging system in an imaging system according to the present invention.

As shown in FIG. 9, in an inversive geometry imaging system, a narrow-beam X-ray needs to be generated and emitted by the anode target structure 3 of the scanning-type X-ray source, and the scanning-type X-ray source is distributed on a plane meeting a frame of the inversive geometry imaging system.

Figure 10:
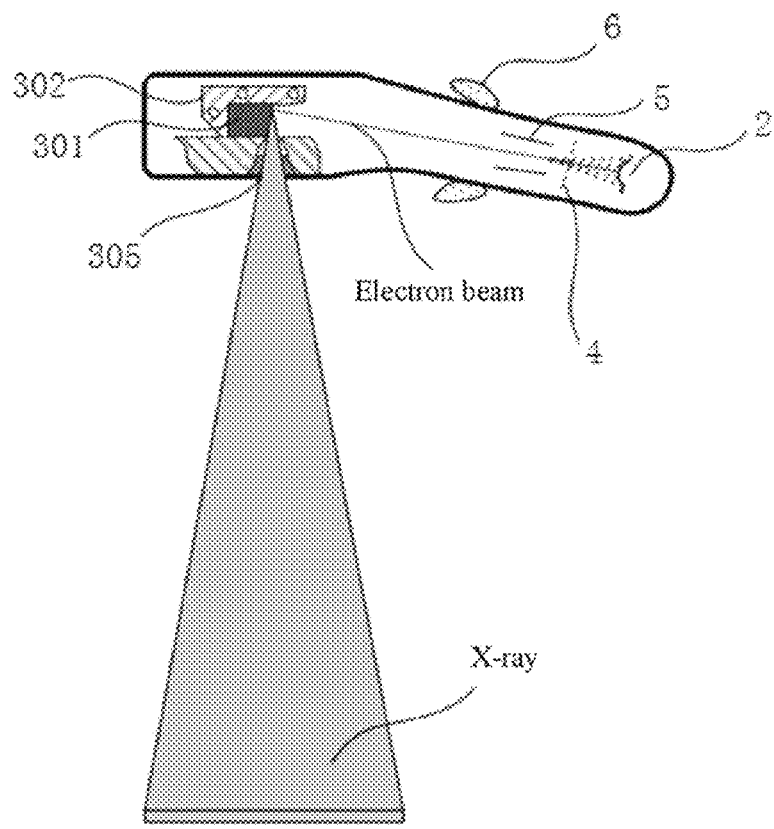
FIG. 10 and FIG. 11 are schematic diagrams of a layout structure of an imaging system using a digital TOMO system in an imaging system according to the present invention.
Figure 11:
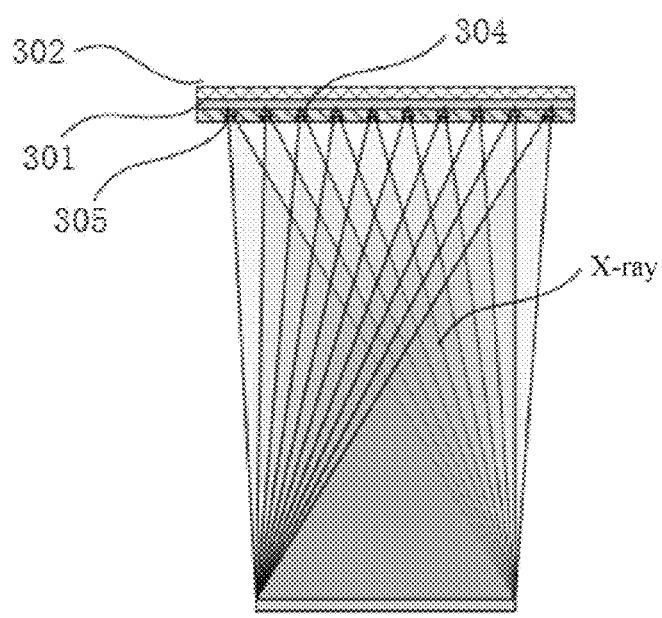

As shown in FIG. 10 and FIG. 11, in a digital TOMO system (for example, a mammary gland TOMO function), a wide-beam X-ray needs to be generated and emitted by the anode target structure 3 of the scanning-type X-ray source, and the scanning-type X-ray source is distributed on an arc surface or a straight line surface meeting a frame of the digital TOMO system.

Figure 12:
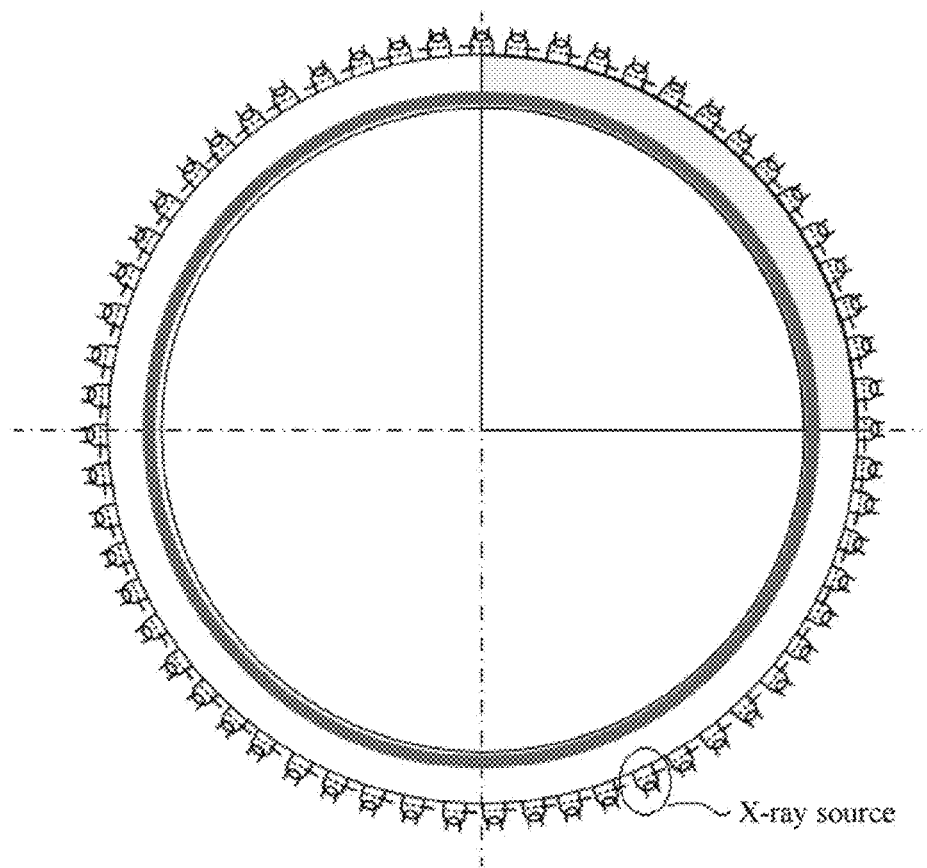
FIG. 12 and FIG. 13 are schematic diagrams of a layout structure of an imaging system using a static CT system in an imaging system according to the present invention.
Figure 13:
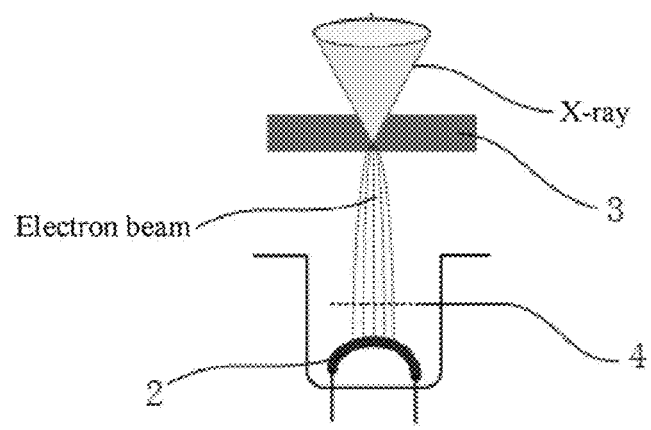

As shown in FIG. 12 and FIG. 13, in a static CT system, a wide-beam X-ray needs to be generated and emitted by the anode target structure 3 of the scanning-type X-ray source, and the scanning-type X-ray source is distributed on a ray circle meeting a frame of the static CT system. For example, a plurality of scanning-type X-ray sources are distributed on the ray circle according to a design requirement of the static CT system, and each scanning-type X-ray source is controlled independently. An anode target structure 3 of each scanning-type X-ray source uses an integral reflection target, and a plurality of collimation holes are arranged on a steel plate of the integral reflection target in a linear array form (a quantity of lines (in a Y direction) of collimation holes is 1). In addition, an electron beam emitted by a cathode filament of each scanning-type X-ray source directly faces a location of a target surface.

The scanning-type X-ray source and the imaging system therefor provided in the present invention are described in detail above. For a person of ordinary skill in the art, any obvious modifications made to the present invention without departing from the essence of the present invention will constitute an infringement of patent rights of the present invention, and corresponding legal liabilities will be born.

What is claimed is:

1. A scanning-type X-ray source, comprising a vacuum cavity, wherein a cathode and a plurality of anode target structures are disposed inside the vacuum cavity, a location close to the cathode inside the vacuum cavity is provided with a grid, a location close to the grid inside the vacuum cavity is provided with a focusing electrode, and a location that is close to the grid and that is on the periphery of the vacuum cavity is provided with a deflection coil;

the grid controls an electron beam generated by the cathode to bombard target surfaces of corresponding anode target structures one by one according to a preset rule after being focused by the focusing electrode and deflected by a movement direction of the deflection coil, and generates X-rays from bombarding sides of a target surface, to form a plurality of focuses arranged according to a preset arrangement shape; and when a narrow-beam X-ray is generated and emitted by at least one anode target structure and the at least one anode target structure uses an integral reflection target, an upper surface of the integral reflection target is provided with a heat dissipation block, an upper surface of the heat dissipation block is provided with a steel plate, a plurality of collimation holes are arranged on the steel plate in a linear array form, and a collimation hole corresponds to one beryllium window, to form a plurality of exit ports of the X-ray; the collimation hole is embedded in the steel plate, and the beryllium window is embedded in the heat dissipation block and the steel plate and runs through the corresponding collimation hole.

2. The scanning-type X-ray source according to claim 1, wherein the scanning-type X-ray source is provided with a grid-controlled switch, the grid-controlled switch is fixed to the vacuum cavity through a support, an output end of the grid-controlled switch is connected to the grid through a wire, the grid-controlled switch is connected to a grid-controlled power supply, and the grid-controlled power supply is connected to an external high voltage power supply.

3. The scanning-type X-ray source according to claim 1, wherein the deflection coil comprises an X direction deflection coil and a Y direction deflection coil, the X direction deflection coil and the Y direction deflection coil are respectively provided with control interfaces, the control interfaces are separately connected to a master control circuit, and the master control circuit respectively applies preset voltage waveforms to the control interfaces of the X direction deflection coil and the Y direction deflection coil, to control a motion direction of the electron beam generated by the cathode.

4. The scanning-type X-ray source according to claim 1, wherein when an X-ray is generated and emitted by one anode target structure and the one anode target structure uses an integral reflection target, the electron beam emitted by the cathode directly faces a target surface of the integral reflection target.

5. The scanning-type X-ray source according to claim 1, wherein when X-rays are generated and emitted by the plurality of anode target structures arranged in a linear array form, and an anode target structure uses an independent individual reflection target, the electron beam emitted by the cathode directly faces a target surface of the independent individual reflection target.

6. A scanning-type X-ray source, comprising a vacuum cavity, wherein a cathode and a plurality of anode target structures are disposed inside the vacuum cavity, a location close to the cathode inside the vacuum cavity is provided with a grid, a location close to the grid inside the vacuum cavity is provided with a focusing electrode, and a location that is close to the grid and that is on the periphery of the vacuum cavity is provided with a deflection coil;

the grid controls an electron beam generated by the cathode to bombard target surfaces of corresponding anode target structures one by one according to a preset rule after being focused by the focusing electrode and deflected by a movement direction of the deflection coil, and generates X-rays from bombarding sides of a target surface, to form a plurality of focuses arranged according to a preset arrangement shape; and when a narrow-beam X-ray is generated and emitted by at least one anode target structure and the at least one anode target structure is arranged in an array form, the at least one anode target structure uses an independent individual reflection target, an upper surface of the independent individual reflection target is provided with a heat dissipation block, an upper surface of the heat dissipation block is provided with a steel plate, the steel plate is provided with a collimation hole corresponding to the independent individual reflection target, and the collimation hole corresponds to one beryllium window, to form a plurality of exit ports of the X-ray; the collimation hole is embedded in the steel plate, and the beryllium window is embedded in the heat dissipation block and the steel plate and runs through the corresponding collimation hole.

7. The scanning-type X-ray source according to claim 6, wherein the scanning-type X-ray source is provided with a grid-controlled switch, the grid-controlled switch is fixed to the vacuum cavity through a support, an output end of the grid-controlled switch is connected to the grid through a wire, the grid-controlled switch is connected to a grid-controlled power supply, and the grid-controlled power supply is connected to an external high voltage power supply.

8. The scanning-type X-ray source according to claim 6, wherein the deflection coil comprises an X direction deflection coil and a Y direction deflection coil, the X direction deflection coil and the Y direction deflection coil are respectively provided with control interfaces, the control interfaces are separately connected to a master control circuit, and the master control circuit respectively applies preset voltage waveforms to the control interfaces of the X direction deflection coil and the Y direction deflection coil, to control a motion direction of the electron beam generated by the cathode.

9. The scanning-type X-ray source according to claim 6, wherein when an X-ray is generated and emitted by one anode target structure and the one anode target structure uses an integral reflection target, the electron beam emitted by the cathode directly faces a target surface of the integral reflection target.

10. The scanning-type X-ray source according to claim 6, wherein when X-rays are generated and emitted by the plurality of anode target structures arranged in a linear array form, and an anode target structure uses an independent individual reflection target, the electron beam emitted by the cathode directly faces a target surface of the independent individual reflection target.

11. An imaging system, comprising the scanning-type X-ray source according to claim 1 or 6.

* * * * *